Patented Mar. 11, 1941

2,234,705

UNITED STATES PATENT OFFICE 2,234,705

CELLULOSE ORGANIC DERIVATIVE COMPOSITION CONTAINING ESTERS OF MONOALKOXY BENZOIC ACIDS

James B. Normington and Fred C. Duennebier, Rochester, N. Y., assignors to Eastman Kodak Company, Rochester, N. Y., a corporation of New Jersey No Drawing. Application April 12, 1940, Serial No. 329,347

5 Claims. (Cl. 106—40)

This invention relates to compositions of matter in which cellulose organic derivatives, by which term we mean to include the cellulose organic acid esters and the cellulose ethers, e. g. cellulose acetate, cellulose acetate-propionate, cellulose acetate-butyrate, cellulose propionate, cellulose butyrate, ethyl cellulose, benzyl cellulose and the like, are compounded with a plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce compositions of matter which are capable of easy and convenient manipulation in the plastic and analogous arts, such as in the manufacture of sheets, film, artificial silk filaments, varnishes, lacquers and the like, and to produce compositions which will not injure, or be injured by, the substances or surfaces with which they are associated during manufacture. Another object of our invention is to produce compositions which can be molded at elevated temperatures and high pressures to produce plastic products having the desirable properties of hardness, toughness and elasticity.

We have discovered that valuable properties may be induced in and/or contributed to cellulose organic derivatives, such as those enumerated above, by adding thereto, as a plasticizer, a compound selected from the group consisting of the benzyl, cyclo hexyl and tetrahydrofurfuryl esters of the lower mono-alkoxy benzoic acids, such, for instance, as benzyl anisate, benzyl o-methoxybenzoate, benzyl p-ethoxybenzoate, cyclohexyl anisate, cyclohexyl o-methoxybenzoate, tetrahydrofurfuryl anisate, tetrahydrofurfuryl p-ethoxybenzoate, and the like. These compounds have low vapor pressures, and are remarkably stable to heat and to hydrolysis. The particularly useful properties which they induce in or contribute to cellulose organic derivative compositions containing them are hereinafter enumerated.

Benzyl anisate may be prepared as follows:

One gram-molecule of anisic acid, two gram-molecules of benzyl alcohol, 400 cc. of toluene and 2 cc. of concentrated sulfuric acid are distilled, an azeotrope of toluene and water being distilled off and the toluene separated and returned to the reaction flask until the theoretical amount of water has been removed. The solution is then cooled, neutralized with dilute sodium carbonate, washed with water, and distilled under vacuum. Benzyl anisate boils at 150–155° C. at 1 mm. Hg pressure.

Cyclohexyl anisate, which boils at 140–143° C. at 1 mm. Hg pressure, and tetrahydrofurfuryl anisate, which boils at 160–165° C. at 1 mm. Hg pressure, may be prepared in a similar manner, using cyclohexanol and tetrahydrofurfuryl alcohol, respectively, in place of benzyl alcohol.

Benzyl p-ethoxybenzoate may be prepared as follows:

150 g. of p-ethoxybenzoic acid, 150 g. of benzyl alcohol, 300 cc. of toluene and 2 g. of ferric chloride are reacted and worked up in the manner described above. Benzyl p-ethoxybenzoate boils at 162–167° C. at 2 mm. Hg pressure.

Tetrahydrofurfuryl p-ethoxybenzoate, which boils at 170–173° C. at 2 mm. Hg pressure, may be prepared in a similar manner, using tetrahydrofurfuryl alcohol in place of benzyl alcohol.

Cyclohexyl o-methoxybenzoate may be prepared as follows:

One gram-molecule of o-methoxybenzoyl chloride (prepared from o-methoxybenzoic acid and thionyl chloride) is treated with an excess of cyclohexanol on the steam bath until the evolution of hydrogen chloride ceases. The solution is then neutralized with sodium carbonate and distilled. Cyclohexyl o-methoxybenzoate boils at 120–125° C. at 1 mm. Hg pressure. Benzyl o-methoxybenzoate can be prepared in a similar manner, using benzyl alcohol in place of cyclohexanol.

In order that those skilled in this art may better understand our invention we would state, by way of illustration, that for the manufacture of photographic film base or other sheets our new compositions of matter may be compounded as follows: 100 parts of acetone-soluble cellulose acetate, i. e., cellulose acetate containing from about 36% to 42% acetyl radical, is dissolved with stirring at atmospheric temperature in 300 to 500 parts, preferably 400 parts, by weight, of acetone. To this solution may be added from 10 to 50 parts by weight of any of our novel plasticizers. Within the limits stated, the amount of plasticizer may be decreased or increased, depending upon whether it is desired to decrease or increase, respectively, the properties which this plasticizer contributes to the finished product. The amount of volatile solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with our invention are very tough and flexible, and maintain flexibility in a superior fashion.

Other volatile solvents which are compatible with cellulose acetate and our new plasticizers will also occur to those skilled in this art, such as ethylene chloride-alcohol mixtures. In like manner these plasticizers may be compounded with other single organic acid esters of cellulose, such as cellulose propionate, butyrate, stearate and the like, or with mixed organic acid esters, such as cellulose acetate-stearate, cellulose acetate-propionate, cellulose acetate-butyrate, cellulose acetate-lactate, cellulose acetate-tartrate or the like, a suitable solvent which will dissolve both the cellulose ester and the plasticizer being employed, such, for instance, as an alkylene chloride with or without the addition of alcohol. For instance, cellulose acetate-propionate and any of our novel plasticizers may be dissolved in ethylene chloride or in a mixture of propylene chloride and methanol, and sheets of excellent flexibility may be deposited from these solutions. When our plasticizers are used with cellulose ethers, one or more of the many known volatile solvents for cellulose ethers may be employed, such, for instance, as toluene-alcohol mixtures. Other substances, such as fire retardents, evaporation retardents, etc., may be added to the film-forming compositions.

The benzyl, cyclohexyl and tetrahydrofurfuryl esters of the lower mono-alkoxy benzoic acids may also be advantageously used as plasticizers in cellulose organic ester or ether molding compositions or compositions for extrusion. For instance, about 20 to 120 parts of the plasticizer, depending on the hardness or softness of the plastic desired, may be homogeneously mixed with 100 parts of the cellulose derivative, and molded to any desired shape, or, in the case of the softer plastics, extruded to form a sheet, rod, or tube, in a manner well known to those skilled in the art. Extruded sheets of cellulose derivatives containing high percentages of these plasticizers are suitable for use as interlayers in laminated glass.

What we claim as our invention and desire to be secured by Letters Patent of the United States is:

1. A composition comprising a cellulose organic derivative selected from the group consisting of the cellulose organic acid esters and the cellulose ethers, and, as a plasticizer therefor, a compound selected from the group consisting of the benzyl, cyclohexyl and tetrahydrofurfuryl esters of the lower mono-alkoxy benzoic acids.

2. A transparent, flexible sheet comprising 100 parts of a cellulose organic derivative selected from the group consisting of the cellulose organic acid esters and the cellulose ethers, and, as a plasticizer therefor, from 10 to 120 parts, by weight, of a compound selected from the group consisting of the benzyl, cyclohexyl and tetrahydrofurfuryl esters of the lower mono-alkoxy benzoic acids.

3. A composition comprising a cellulose organic derivative selected from the group consisting of the cellulose organic acid esters and the cellulose ethers, and a benzyl ester of a lower mono-alkoxy benzoic acid as a plasticizer therefor.

4. A composition comprising a cellulose organic derivative selected from the group consisting of the cellulose organic acid esters and the cellulose ethers, and a cyclohexyl ester of a lower mono-alkoxy benzoic acid as a plasticizer therefor.

5. A composition comprising a cellulose organic derivative selected from the group consisting of the cellulose organic acid esters and the cellulose ethers, and a tetrahydrofurfuryl ester of a lower mono-alkoxy benzoic acid as a plasticizer therefor.

JAMES B. NORMINGTON.
FRED C. DUENNEBIER.